H. FUCHS.
HOT AIR INCUBATOR.
APPLICATION FILED SEPT. 5, 1911.
1,070,677.  Patented Aug. 19, 1913.
2 SHEETS—SHEET 1.
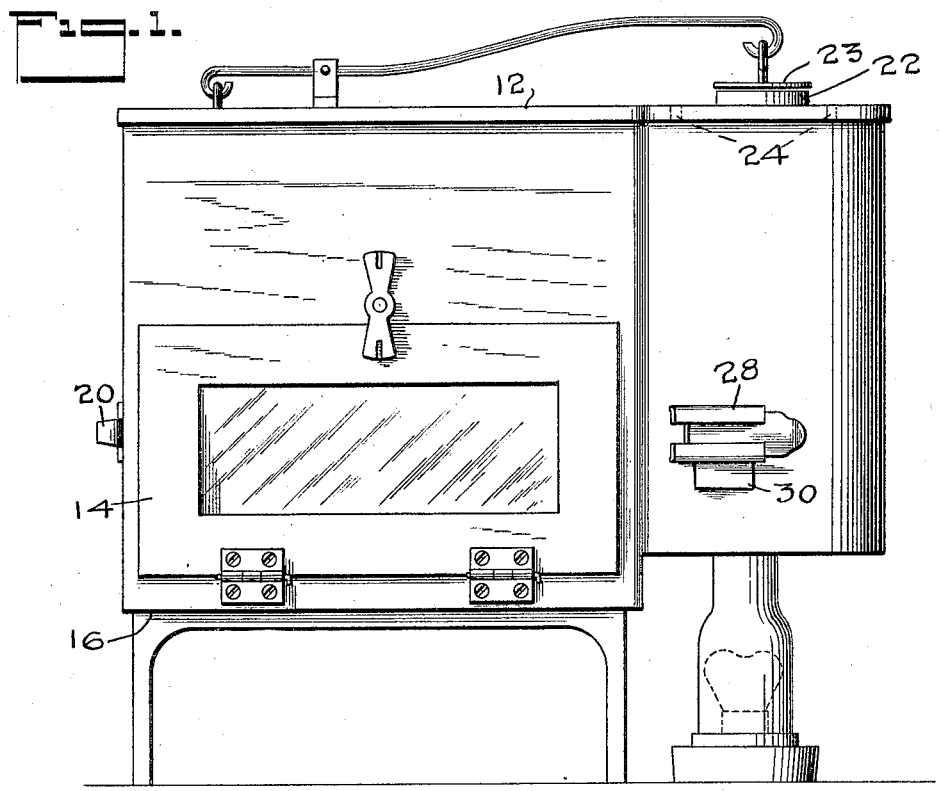
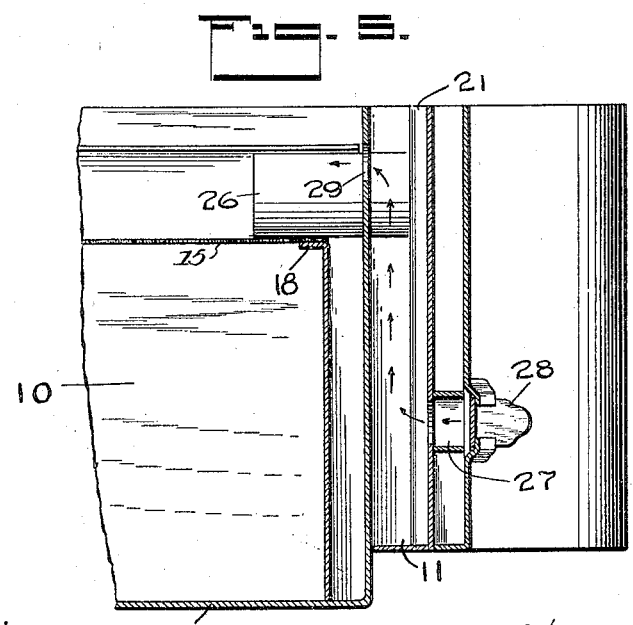

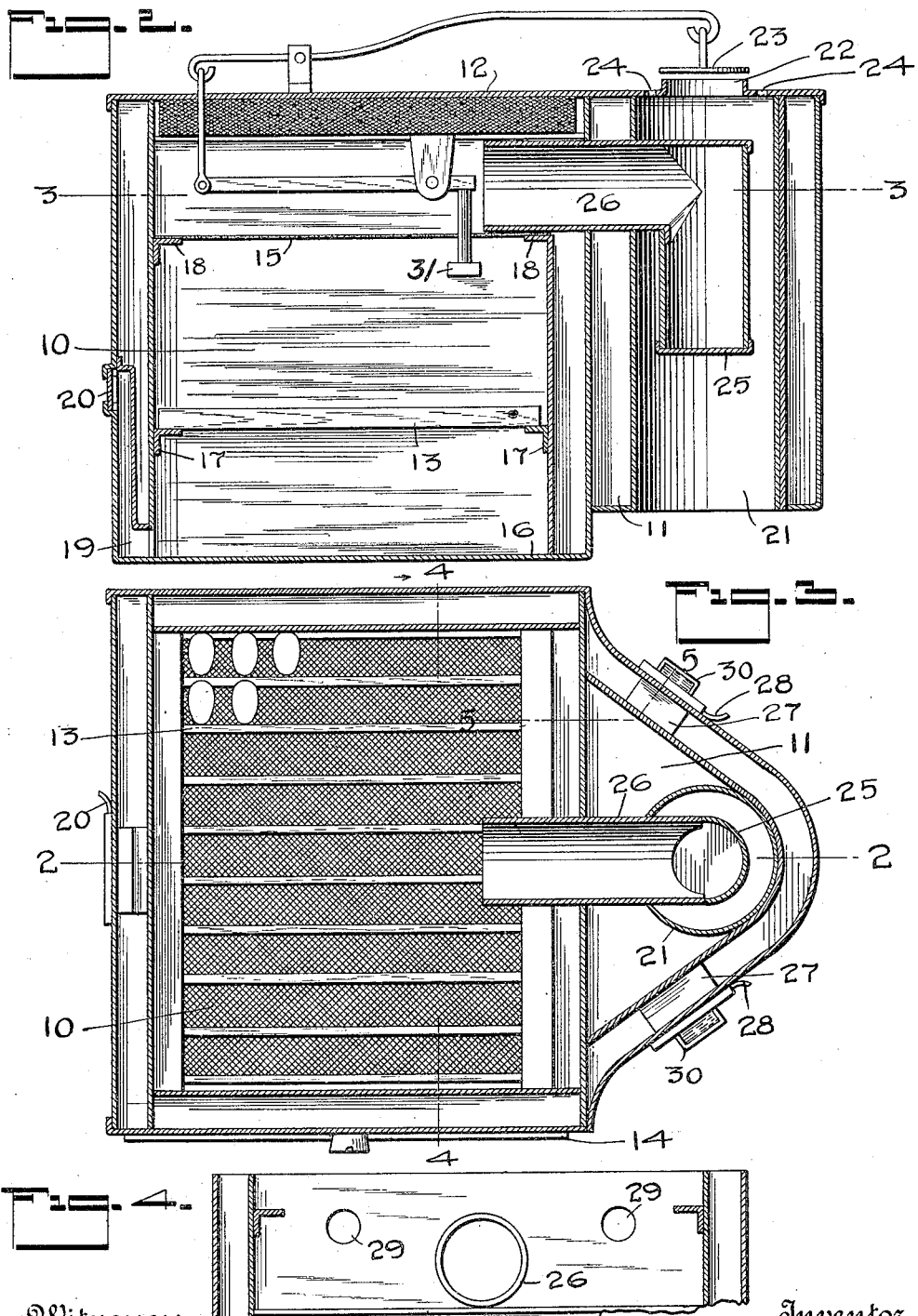

UNITED STATES PATENT OFFICE.

HENRY FUCHS, OF JERSEY CITY HEIGHTS, NEW JERSEY.

HOT-AIR INCUBATOR.

1,070,677.  Specification of Letters Patent.  Patented Aug. 19, 1913.

Application filed September 5, 1911. Serial No. 647,593.

*To all whom it may concern:*

Be it known that I, HENRY FUCHS, a citizen of the United States, residing at Jersey City Heights, in the county of Hudson and State of New Jersey, have invented a new and useful Hot-Air Incubator, of which the following is a specification.

My invention relates to an improvement in hot air incubators for the hatching of eggs in which the incubator is provided with a fresh air chamber which is an extension of the egg chamber or main portion of the incubator, this fresh air chamber having within it a flue inclosing a heating drum and being arranged to receive the means for heating the drum, the flue serving to separate from the fresh air chamber the heating drum and the means for heating the same, the heat from the drum and the air from the fresh air chamber being independently conveyed to the egg chamber. The effect of this construction is that the outside air from the fresh air chamber and the heated air from the means of heating are introduced into the egg or incubating chamber free from smoke or fumes from the means of heating and a purer heated atmosphere provided for the incubating chamber.

The objects of my invention are, (1) to provide an incubator which can be made of metal and in which the danger from fire is reduced to a minimum, (2) to provide an incubator which shall be light in weight and cheap to manufacture (3) to provide an incubator which while of the same egg capacity as a wooden incubator is smaller in size, lighter in weight and occupies less space, and (4) to provide an incubator in which there shall be a moist and efficient heat condition in the egg chamber and one more nearly approaching the heat condition provided by the fowl when setting upon a nest of eggs.

I attain these objects by the device illustrated in the accompanying drawings in which—

Figure 1, is a side elevation of my incubator. Fig. 2, is a vertical section of my incubator. Fig. 3 is, a horizontal section on the line 3—3 of Fig. 2. Fig. 4, is a partial section on the line 4—4 of Fig. 3 with the lid removed. Fig. 5, is a section on the line 5—5 of Fig. 3.

Similar numerals refer to similar parts throughout the several views.

My incubator, which is made of metal and is supported by suitable legs, comprises an egg compartment or chamber, 10, and a fresh air chamber, 11, the fresh air chamber, 11, being an extension of the egg chamber, 10, the walls of both chambers, 10 and 11, being double to provide dead air space wherever such construction is available.

The fresh air chamber, 11, is shown in the drawings of oval form, but it can as well be rectangular in continuation of the lines of the egg chamber, 10.

The egg chamber, 10, is provided with a suitable covering top, 12, having a lining of asbestos or other heat non-conducting material, an egg tray, 13, a door, 14, to allow of placing and turning the eggs, a filter frame, 15, of cloth or fine mesh wire to temper and distribute the heated air over the egg tray, and a bottom, 16. The egg tray, 13, is supported on angle brackets, 17, attached to the inner walls of the egg chamber, 10, at each of the ends of the chamber, and the filter frame, 15, rests upon similar angle brackets, 18.

The egg chamber, 10, is provided with an exhaust or foul air flue, 19, extending upward from the bottom, 16, of the chamber, 10, with an outlet through the end walls of the chamber, 10, this outlet having a damper slide, 20.

The fresh air chamber, 11, is closed at top and bottom and is double walled for dead air space wherever available and is shown in the drawings extending downward from the line of the top of the egg chamber, 10, nearly to the line of the bottom, 16, thereof, this construction being to provide for the introduction of a heating lamp into the heat flue hereinafter described situated within the fresh air chamber 11. But the fresh air chamber, 11, may be made the same height as the egg chamber, 10, if the legs supporting the incubator are of sufficient length to permit the insertion of the lamp above mentioned.

The fresh air chamber, 11, has within it a circular flue, 21, which extends from the bottom to the top of the fresh air chamber, 11. The flue, 21, has at its top a heat vent or outlet, 22, having a lifting cap, 23, and is also provided in its top with circular openings, 24, for draft for the means of heating and to carry off the smoke and fumes arising therefrom. Within the flue, 21, is a heating drum or cylinder, 25, closed at its top and bottom having a branch, 26, extending through the wall of the flue, 21, and through the fresh air chamber, 11, into the egg chamber, 10, and furnishing means of communication between the heating drum, 25, and the chamber, 10, which branch, 26, supports the drum, 25, within the flue, 21, by engagement with the walls of the fresh air chamber and the flue, 21. The branch, 26, enters the egg chamber, 10, at a point above the line of the filter frame 15.

The fresh air chamber, 11, is provided with inlet air flues, 27, situated near the bottom of the chamber, 11, extending through the double wall thereof and having damper slides, 28. Outlets, 29, situated slightly above or substantially on a line with the inner end or end of the branch, 26, extending into the chamber, 10, and above the line of the filter frame, 15, permit the passage of air from the inlet flues, 27, of the fresh air chamber, 11, into the egg chamber, 10. Water cups, 30, may be attached to the outer wall of the fresh air chamber, 11, below the inlet air flues, 27, to give additional moisture to the air admitted to the fresh air chamber, 11. A thermostat, 31, is attached to the lifting cap, 23, of the heat vent, 22, of the case, 21, to regulate the supply of heat to the egg chamber, 10, from the heat drum, 25.

The operation of my incubator is as follows: The eggs having been placed on the egg tray, 13, a lighted lamp or other means of heating is inserted into the flue, 21, of the fresh air chamber, 11, so that the heat is applied directly to the drum, 25, and confined to the flue, 21, and the damper slides, 28, of the air flues, 27, of the fresh air chamber, 11, are adjusted to admit the desired amount of outside air. This outside air, after being somewhat heated by the radiation from the flue, 21, and from the branch, 26, passes through the outlets, 29, from the fresh air chamber into the egg chamber, and thence, through the effect of the heat applied to the drum, 25, passes into the branch, 26, as a circulating current in a lower stratum down and into the drum, 25, and thence in heated form upward and through the branch, 26, in an upper stratum into the incubating chamber, 10, where it is deflected downward over the eggs in the form of a heated but moist atmosphere, to which greater moisture may be given by means of the water cups, 30, while the smoke and fumes from the means of heating are carried off by the draft and vent holes, 24, of the flue, 21; the essential feature of my invention being the keeping of the fresh or outside air from direct contact with the means of heating until after it passes into the egg or incubating chamber and separating and preserving this air from all smoke and fumes of the heating means.

The construction of my incubator of metal permits the fresh air chamber, containing the heating means, to be made an extension or prolongation of the walls of the main or egg portion of the device, there being no danger of ignition of the incubator from the immediate proximity of the heating means, as is the case where the main portion of the incubator is of wood. The use of metal also allows of a lighter and cheaper construction of the incubator as the metal parts can be stamped or pressed out, and by doing away with thick wooden walls and parts the egg capacity of a smaller incubator of my make will equal the capacity of a larger incubator of wood. My construction also provides the desirable heat condition or atmosphere in the egg chamber hereinabove set forth.

Having fully described my invention what I claim and desire to protect by Letters Patent is:—

1. A heater for incubators having an egg chamber or compartment, said heater comprising a fresh air chamber having fresh air inlets and outlets, said outlets communicating with the egg chamber of the incubator, a flue for products of combustion extending through the fresh air chamber, a heating drum contained within said flue, means for heating the heating drum, and means for communication between the heating drum and the egg chamber of the incubator; substantially as set forth.

2. A heater for incubators having an egg chamber or compartment, said heater comprising a fresh air chamber having fresh air inlets and outlets, said outlets communicating with the egg chamber of the incubator near the top thereof, a flue for products of combustion extending through the fresh air chamber open at its bottom to receive the means for heating and having means for draft and vent at its top, a heating drum contained within said flue, means for heating the heating drum, and means for communication between the heating drum and the egg chamber of the incubator, said means for communication entering the egg chamber of the incubator at a point on or slightly below the line of the outlets from the fresh air chamber into said egg chamber; substantially as set forth.

3. A heater for incubators having an egg chamber or compartment, said heater comprising a fresh air chamber forming an extension of the egg chamber of the incubator and having fresh air inlets and outlets, said outlets communicating with the egg chamber of the incubator near the top thereof, a flue for products of combustion extending through the fresh air chamber from the bottom to the top thereof open at its bottom to receive the means for heating and having means for draft and vent at its top, a heating drum contained within said flue, means for heating the heating drum, and a branch for communication between said drum and the egg chamber of the incubator, said branch passing through the wall of the above mentioned flue and through the fresh air chamber and the wall thereof and entering the egg chamber of the incubator at a point on or slightly below the line of the outlets from the fresh air chamber into said egg chamber; substantially as set forth.

HENRY FUCHS.

Witnesses:
CHAS. R. TANSILL,
WM. H. GEE.